(12) United States Patent
Nakamura

(10) Patent No.: US 10,494,025 B2
(45) Date of Patent: Dec. 3, 2019

(54) PARKING ASSIST APPARATUS

(71) Applicant: TOYOTA JIDOSHA KABUSHIKI KAISHA, Toyota-shi, Aichi-ken (JP)

(72) Inventor: Hiroshi Nakamura, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/014,485

(22) Filed: Jun. 21, 2018

(65) Prior Publication Data
US 2019/0031239 A1    Jan. 31, 2019

(30) Foreign Application Priority Data
Jul. 31, 2017    (JP) .................................. 2017-147946

(51) Int. Cl.
*B62D 15/02* (2006.01)
*G05D 1/00* (2006.01)
*G05D 1/02* (2006.01)
*B60W 30/06* (2006.01)
*B60W 30/18* (2012.01)

(52) U.S. Cl.
CPC ......... *B62D 15/0285* (2013.01); *B60W 30/06* (2013.01); *G05D 1/0088* (2013.01); *G05D 1/0274* (2013.01); *B60T 2201/10* (2013.01); *B60W 30/18036* (2013.01); *B60Y 2300/06* (2013.01); *G05D 1/0033* (2013.01); *G05D 1/0246* (2013.01); *G05D 1/0257* (2013.01)

(58) Field of Classification Search
CPC ............ B60W 30/06; B60W 30/18036; B62D 15/0285; G05D 1/0088; G05D 1/0274; G05D 1/0246; G05D 1/0257; G05D 1/0033; B60T 2201/10; B60Y 2300/06
See application file for complete search history.

(56) References Cited

U.S. PATENT DOCUMENTS

| | | | |
|---|---|---|---|
| 2013/0085637 A1* | 4/2013 | Grimm ................. | B60W 30/06 701/25 |
| 2017/0043766 A1* | 2/2017 | Ha ........................ | B60W 30/06 |
| 2018/0093664 A1* | 4/2018 | Kim ..................... | B62D 15/027 |
| 2018/0186407 A1* | 7/2018 | Kim .................... | G06K 9/00812 |

FOREIGN PATENT DOCUMENTS

| | | |
|---|---|---|
| JP | 4587334 B2 | 11/2010 |
| JP | 6022447 B2 | 11/2016 |

\* cited by examiner

*Primary Examiner* — Rachid Bendidi
(74) *Attorney, Agent, or Firm* — Sughrue Mion, PLLC

(57) ABSTRACT

A parking assist apparatus (13) has: a learning device (131) configured to perform a learning operation for learning, as a target parking position, a position in which a vehicle is parked when the vehicle is parked by a driver's operation; and an assisting device (132) configured to perform a parking assist operation for automatically parking the vehicle in the target parking position on the basis of a learning result of the learning device, if a predetermined condition that there is a predetermined difference between a position of an occupant during an assist period and a position of an occupant during a learning period is satisfied, the assisting device adjusts the target parking position on the basis of the difference so that it is easier to get out of the vehicle after the parking assist operation is finished, compared to a case where the predetermined condition is not satisfied.

5 Claims, 6 Drawing Sheets

[FIG. 1]
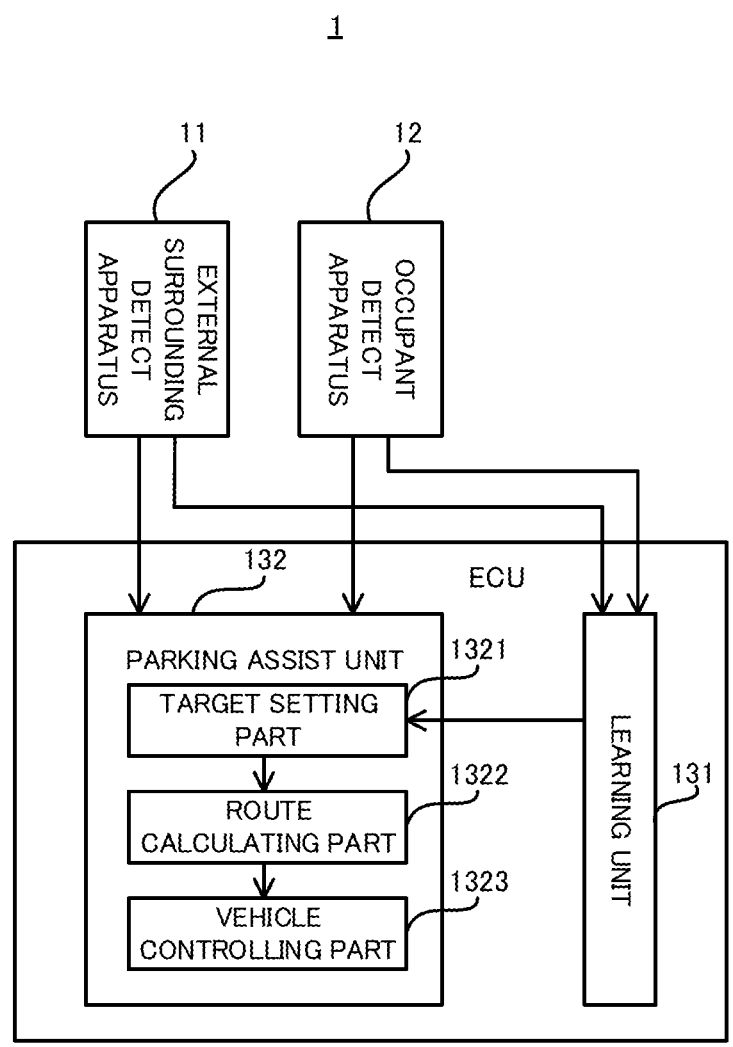

[FIG. 2]
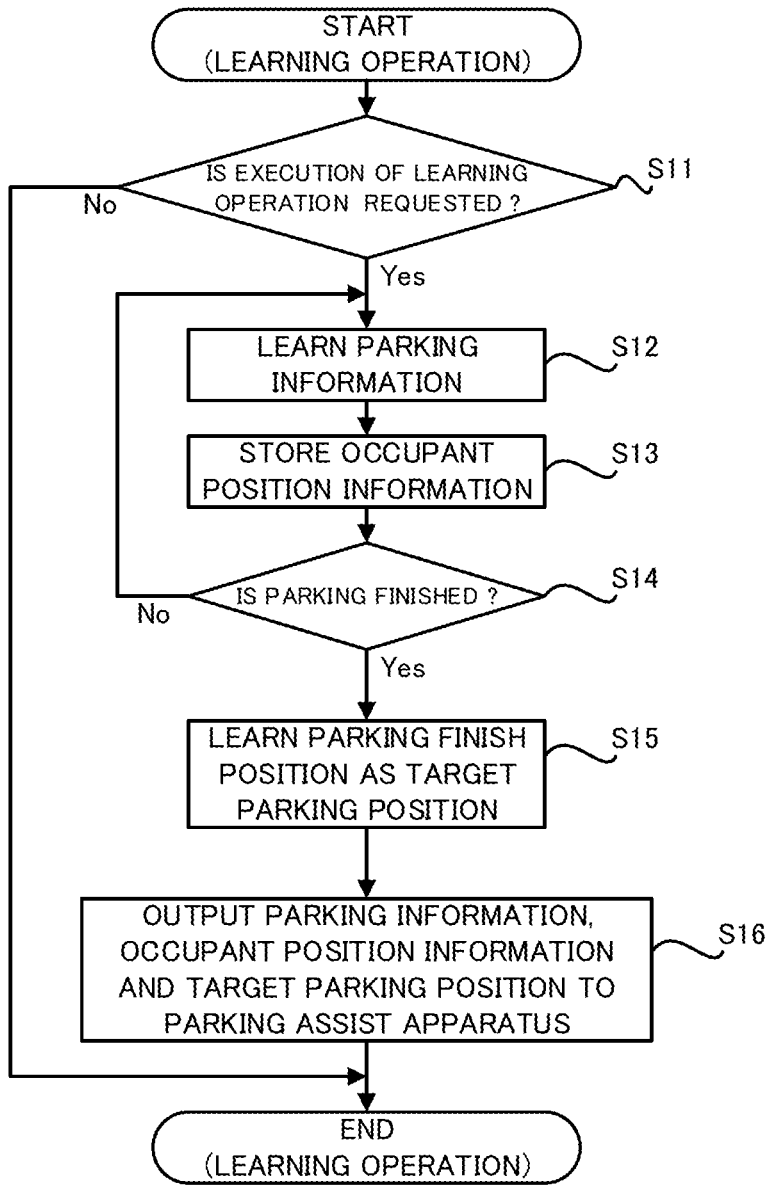

[FIG. 3]
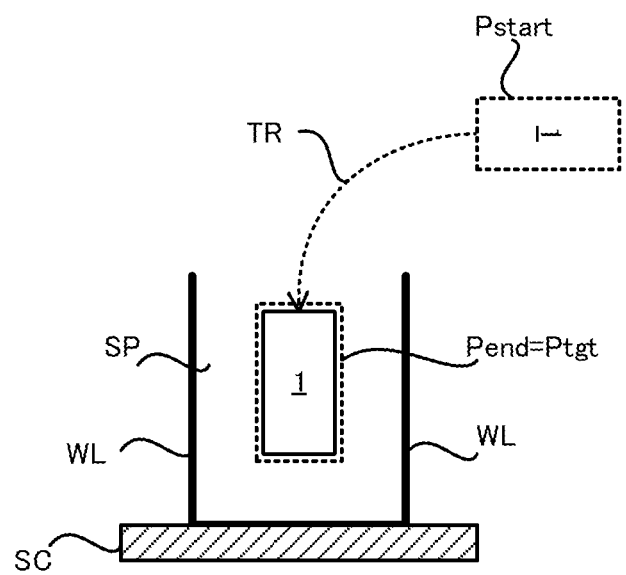
[FIG. 4]
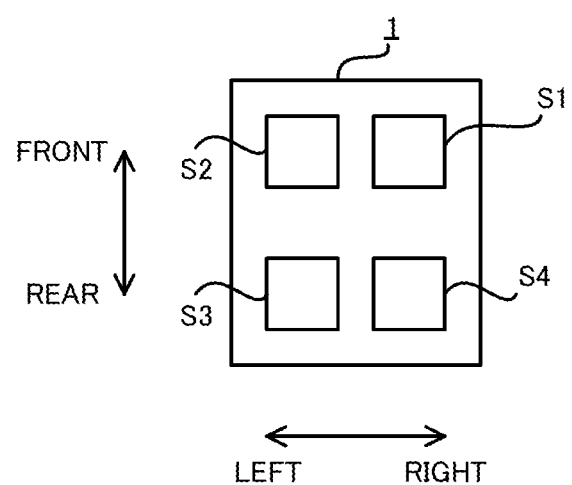

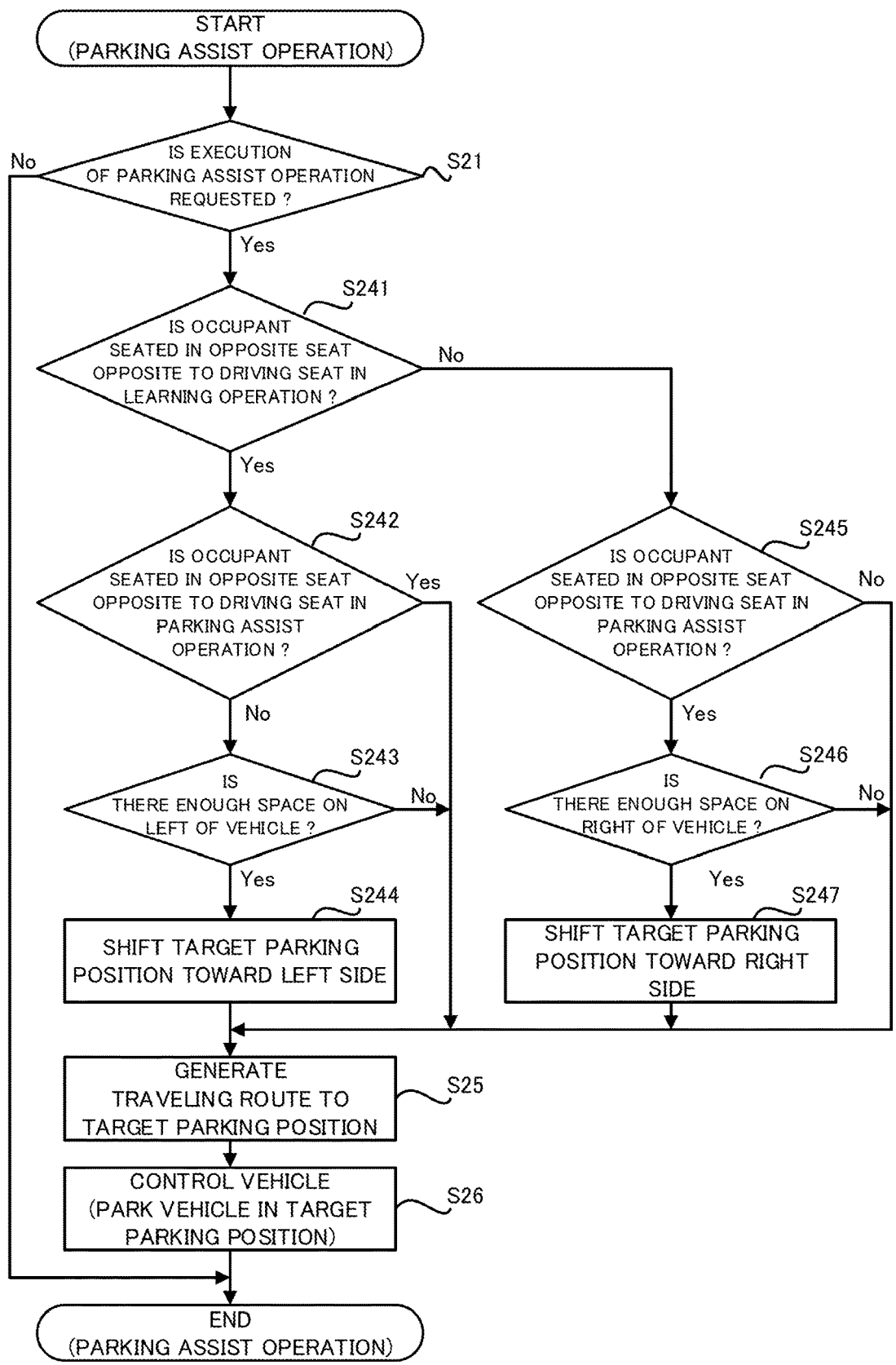
[FIG. 5]

<LEARNING OPERATION>

<PARKING ASSIST OPERATION:
TARGET PARKING POSITION IS NOT ADJUSTED>

<PARKING ASSIST OPERATION:
TARGET PARKING POSITION IS ADJUSTED>

<LEARNING OPERATION>

<PARKING ASSIST OPERATION:
TARGET PARKING POSITION IS NOT ADJUSTED>

<PARKING ASSIST OPERATION:
TARGET PARKING POSITION IS ADJUSTED> ic field of a
PARKING ASSIST APPARATUS

TECHNICAL FIELD

The present invention relates to a technical field of a parking assist apparatus that is configured to perform a parking assist for automatically parking a vehicle in a target parking position, for example.

BACKGROUND ART

A Patent Literature 1 discloses one example of a parking assist apparatus. Specifically, the Patent Literature 1 discloses the parking assist apparatus that is configured to operate in two modes of a learning more and an operating mode. The parking assist apparatus operating in the learning mode is configured to learn a surrounding of a parking space (for example, a parking lot, a garage or the like) when a driver parks a vehicle in the parking space by a driver's operation. The parking assist apparatus operating in the operating mode is configured to automatically park the vehicle in the parking space in which the vehicle is parked in the learning mode by using a leaning result in the learning mode. As a result, the vehicle is parked in a parking position that is same as a parking position in the parking space in which the vehicle is parked in the learning mode.

Note that there is a Patent Literature 2 as another document relating to the present invention.

CITATION LIST

Patent Literature

[Patent Literature 1] Japanese Patent No. 6022447
[Patent Literature 2] Japanese Patent No. 4587334

SUMMARY OF INVENTION

Technical Problem

A position (namely, a seating position) of an occupant in the vehicle during a learning period when the parking assist apparatus operates in the leaning mode is not necessarily the same as a position of the occupant in the vehicle during an operating period when the parking assist apparatus operates in the operating mode. However, the above described parking assist apparatus disclosed in the Patent Literature 1 does not consider a difference between the position of the occupant during the learning period and the position of the occupant during the operating period. Thus, if the position of the occupant during the learning period is different from the position of the occupant during the operating period, there is a possibility that the parking position in which the vehicle is parked in the learning mode is not optimum as the parking position in which the vehicle is parked in the operating mode, which is a technical problem. Specifically, there is a possibility that it is not easy for the occupant to get out of the vehicle if the vehicle is parked in the operating mode in the parking position in which the vehicle is parked in the learning mode, which is a technical problem.

The above described technical problem is one example of the technical problem to be solved by the present invention. It is therefore an object of the present invention to provide, for example, a parking assist apparatus that is configured to automatically park the vehicle in a more appropriate parking position.

Solution to Problem

One aspect of a parking assist apparatus of the present invention is a parking assist apparatus having: a learning device that is configured to perform a learning operation for learning, as a target parking position, a position in a predetermined parking space in which a vehicle is parked when the vehicle is parked in the parking space by a driver's operation; and an assisting device that is configured to perform a parking assist operation for automatically parking the vehicle in the target parking position on the basis of a learning result of the learning device, wherein if a predetermined condition that there is a predetermined difference between a position of an occupant in the vehicle during an assist period when the assisting device performs the parking assist operation and a position of an occupant in the vehicle during a learning period when the learning device performs the learning operation is satisfied, the assisting device is configured to adjust the target parking position on the basis of the difference so that it is easier to get out of the vehicle after the parking assist operation is finished, compared to a case where the predetermined condition is not satisfied and then to perform the parking assist operation for automatically parking the vehicle in the adjusted target parking position.

BRIEF DESCRIPTION OF DRAWINGS

FIG. 1 is a block diagram that illustrates a structure of a vehicle in a present embodiment.

FIG. 2 is a flowchart that illustrates a flow of a learning operation in the present embodiment.

FIG. 3 is a planar view that illustrates a situation where the vehicle is parked in a parking space.

FIG. 4 is a planar view that illustrates one example of an arrangement of seats in the vehicle.

FIG. 5 is a flowchart that illustrates a flow of a parking assist operation in the present embodiment.

DESCRIPTION OF EMBODIMENTS

Figure 6A:
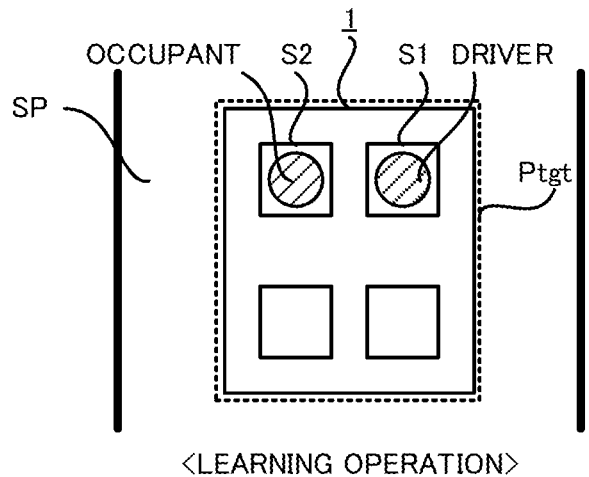
FIG. 6(a) is a planar view that illustrates a target parking position learned by the learning operation.

Hereinafter, with reference to drawings, one embodiment of the parking assist apparatus of the present invention will be described. In the following description, a vehicle 1 to which one embodiment of the parking assist apparatus of the present invention is adapted will be described.

(1) Structure of Vehicle 1

Firstly, with reference to FIG. 1, the structure of the vehicle 1 in the present embodiment will be explained. As illustrated in FIG. 1, the vehicle 1 has: an external surrounding detect apparatus 11; an occupant detect apparatus 12;

and an ECU (Electronic Control Unit) 13 that is one example of a "parking assist apparatus" in a below described additional statement.

The external surrounding detect apparatus 11 is a detect apparatus that is configured to detect an external surrounding (in other words, an external circumstance, condition or situation) of the vehicle 1. The external surrounding detect apparatus 11 includes at least one of a camera, radar and the like, for example.

The occupant detect apparatus 12 is a detect apparatus that is configured to detect an occupant (in other words, a passenger, a person or the like) existing in the vehicle 1 (namely, existing in a cabin of the vehicle 1). In the present embodiment, the occupant means a person existing in the vehicle 1 other than a driver. The occupant detect apparatus 12 includes at least one of a seating detect apparatus that is mounted in a seat in which the occupant is seated, a camera that is configured to image an inside of the cabin of the vehicle 1, and the like for example.

The ECU 13 is configured to control entire operation of the vehicle 1. Especially in the present embodiment, the ECU 13 is configured to perform a learning operation for learning, as a target parking position, a parking position in a desired parking space SP in which the vehicle 1 is actually parked when the driver parks the vehicle 1 in the parking space SP. Moreover, the ECU 13 is configured to perform a parking assist operation for automatically parking the vehicle 1 in the target parking position learned by the learning operation.

In order to perform the learning operation and the parking assist operation, the ECU 13 includes, as processing blocks that are logically realized in the ECU 13 or processing circuits that are physically realized in the ECU 13, a learning unit 131 that is one example of a "learning device" in the below described additional statement and a parking assist unit 132 that is one example of a "assisting device" in the below described additional statement. Moreover, the parking assist unit 132 includes, as processing blocks that are logically realized in the parking assist unit 132 or processing circuits that are physically realized in the parking assist unit 132, a target setting part 1321, a route calculating part 1322 and a vehicle controlling part 1323. The operation of each of the learning unit 131 and the parking assist unit 132 will be described later in detail with reference to FIG. 2 and so on).

(2) Operation of ECU 13

Next, the learning operation and the parking assist operation that are performed by the ECU 13 will be described in order.

(2-1) Flow of Learning Operation

Firstly, with reference to FIG. 2, a flow of the learning operation in the present embodiment will be described. FIG. 2 is a flowchart that illustrates the flow of the learning operation in the present embodiment.

As illustrated in FIG. 2, the learning unit 131 determines whether or not the driver requests an execution of the learning operation (a step S11). Specifically, the learning unit 131 determines whether or not the driver operates an operating apparatus (especially, an operating apparatus that is operated by the driver to request the execution of the learning operation) of the vehicle 1. If the driver operates the operating apparatus, the learning unit 131 determines that the driver requests the execution of the learning operation. Note that the driver typically requests the execution of the learning operation in parking the vehicle 1 in the parking space SP, because the learning operation is performed when the driver parks the vehicle 1 in the parking space SP.

As a result of the determination at the step S11, if it is judged that the driver does not request the execution of the learning operation (the step S11: No), the learning unit 131 terminates the learning operation illustrated in FIG. 2. When the learning unit 131 terminates the learning operation illustrated in FIG. 2, the learning unit 131 starts the learning operation illustrated in FIG. 2 again after a first predetermined period has elapsed.

On the other hand, as a result of the determination at the step S11, if it is judged that the driver requests the execution of the learning operation (the step S11: Yes), the learning unit 131 learn parking information that is relating to the vehicle 1 parked by the driver's operation (especially, information that has some kind of relationship with the parking of the vehicle 1) on the basis of a detection result of the external surrounding detect apparatus 11 (a step S12). One example of the parking information is represented in FIG. 3 that illustrates a situation where the vehicle 1 is parked in a certain parking space SP. As illustrated in FIG. 3, the parking information may include information relating to a start position Pstart from which the vehicle 1 is parked in the parking space SP, for example. The parking information may include information relating to a traveling route TR along which the vehicle 1 travels (in other words, moves) toward the parking space SP, for example. The parking information may include information relating to a behavior (for example, a velocity, a traveling direction and the like) of the traveling vehicle 1, for example. The parking information may include information relating to the parking space SP (for example, at least one of information relating to at least one of a position, a size, a shape and the like of the parking space SP, information relating to a white line WL for zoning the parking space SP and the like), for example. The parking information may include information relating to an obstacle SC that exists around (in other words, near) at least one of the vehicle 1 and the parking space SP (for example, information relating to at least one of a position, a size, a shape, a height and the like of the obstacle SC), for example.

Again in FIG. 2, moreover, the learning unit 131 stores occupant position information that represents a position of the occupant(s) in the cabin of the vehicle 1 on the basis of a detection result of the occupant detect apparatus 12 (a step S13). For example, FIG. 4 illustrates an example in which the vehicle 1 has a driving seat S1 that is located on a right side and a front side in the cabin, a front passenger seat S2 that is located on a left side and a front side in the cabin, a rear-left seat S3 that is located on a left side and a rear side in the cabin and a rear-right seat S4 that is located on a right side and a rear side in the cabin. In this case, the learning unit 131 determines whether or not the occupant is actually seated in each of the front passenger seat S2, the rear-left seat S3 and the rear-right seat S4 on the basis of the detection result of the occupant detect apparatus 12. The learning unit 131 identifies the seat in which the occupant is actually seated and stores the position of the identified seat as the position of the occupant. For example, if the occupant is seated in the front passenger seat S2, the learning unit 131 stores, as the occupant position information, information relating to the position of the front passenger seat S2 (namely, the position at the front side and the left side in the cabin).

Note that the example in which the vehicle 1 has the driving seat S1, the front passenger seat S2, the rear-left seat S3 and the rear-right seat S4 will be used in the following description too, for the purpose of simple description. However, the learning operation and the parking assist operation may be performed on a vehicle that does not has at least one of the front passenger seat S2, the rear-left seat S3 and the rear-right seat S4. The learning operation and the parking assist operation may be performed on a vehicle that has another seat (for example, a seat located at the back of the rear-left seat S3 and the rear-right seat S4) in addition to or instead of at least one of the front passenger seat S2, the rear-left seat S3 and the rear-right seat S4.

Then, the learning unit 131 determines whether or not the driver finishes (in other words, completes or ends) parking the vehicle 1 in the parking space SP (a step S14). For example, the learning unit 131 determines whether or not the driver operates an operating apparatus (especially, an operating apparatus that is operated by the driver to transmit information of the parking being finished) of the vehicle 1. If the driver operates the operating apparatus, the learning unit 131 determines that the driver finishes parking the vehicle 1 in the parking space SP. Alternatively, the learning unit 131 may determine that the driver finishes parking the vehicle 1 in the parking space SP if the vehicle 1 stops for more than predetermined time.

As a result of the determination at the step S14, if it is judged that the driver does not finish parking the vehicle 1 in the parking space SP yet (the step S14: No), the learning unit 131 repeats the processes of the step S12 and the step S13. On the other hand, as a result of the determination at the step S14, if it is judged that the driver finishes parking the vehicle 1 in the parking space SP (the step S14: Yes), the learning unit 131 learns a parking finish position (namely, a position in the parking space SP at which the vehicle 1 is actually parked, see FIG. 3) Pend as a target parking position Ptgt (a step S15).

Then, the learning unit 131 outputs the parking information learned at the step S12, the occupant position information stored at the step S13 and the target parking position Ptgt learned at the step S15 to the parking assist unit 132 (a step S16).

(2-2) Flow of Parking Assist Operation

Firstly, with reference to FIG. 5, a flow of the parking assist operation in the present embodiment will be described. FIG. 5 is a flowchart that illustrates the flow of the parking assist operation in the present embodiment.

As illustrated in FIG. 5, the parking assist unit 132 determines whether or not the driver requests an execution of the parking assist operation (a step S21). Specifically, the parking assist unit 132 determines whether or not the driver operates an operating apparatus (especially, an operating apparatus that is operated by the driver to request the execution of the parking assist operation) of the vehicle 1. If the driver operates the operating apparatus, the parking assist unit 132 determines that the driver requests the execution of the parking assist operation.

As a result of the determination at the step S21, if it is judged that the driver does not request the execution of the parking assist operation (the step S21: No), the parking assist unit 132 terminates the parking assist operation illustrated in FIG. 5. When the parking assist unit 132 terminates the parking assist operation illustrated in FIG. 5, the parking assist unit 132 starts the parking assist operation illustrated in FIG. 5 again after a second predetermined period has elapsed.

On the other hand, as a result of the determination at the step S21, if it is judged that the driver requests the execution of the parking assist operation (the step S21: Yes), the parking assist unit 132 automatically parks the vehicle 1 in the target parking position Ptgt learned by the learning unit 131 in the learning operation (a step S25 to a step S26). However, in the present embodiment, if a predetermined difference condition relating to a difference between the position of the occupant during an learning period when the learning operation is performed and the position of the occupant during a parking assist period when the parking assist operation is performed (namely, the current position of the occupant) is satisfied, the parking assist unit 132 adjusts the target parking position Ptgt learned by the learning unit 131 in the learning operation (a step S241 to a step S247) and then automatically parks the vehicle 1 in the adjusted target parking position Ptgt. In the following description, this process will be described in detail (the step S241 to the step S26).

Firstly, the target setting part 1321 determines whether or not the occupant is seated in at least one of the front passenger seat S2 and the rear-left seat S3 in the learning period on the basis of the occupant position information stored by the learning unit 131 (a step S241). Namely, the target setting part 1321 determines whether or not the occupant is seated in an opposite seat that is on the side opposite to the driving seat S1 (specifically, an opposite seat that is on the side opposite to the driving seat S1 in a direction of a width of the vehicle 1, i.e., a crosswise direction) in the learning operation.

As a result of the determination at the step S241, if it is determined that the occupant is seated in the opposite seat that is on the side opposite to the driving seat S1 in the learning period (the step S241: Yes), the target setting part 1321 determines whether or not the occupant is seated in the opposite seat that is on the side opposite to the driving seat S1 in the parking assist period (namely, now) on the basis of the detection result of the occupant detect apparatus 12 (a step S242).

As a result of the determination at the step S242, if it is determined that the occupant is seated in the opposite seat that is on the side opposite to the driving seat S1 in the parking assist period (the step S242: Yes), the occupant is seated in the opposite seat that is on the side opposite to the driving seat S1 in both of the learning period and the parking assist period. In this case, the target setting part 1321 does not determine that the predetermined difference condition is satisfied. In other words, the target setting part 1321 determines that the predetermined difference condition is not satisfied. Thus, the target setting part 1321 does not adjust the target parking position Ptgt learned by the learning unit 131 in the learning operation On the other hand, as a result of the determination at the step S242, if it is determined that no occupant is seated in the opposite seat that is on the side opposite to the driving seat S1 (namely, no occupant is seated in the front passenger seat S2 and the rear-left seat S3) in the parking assist period (the step S242: No), no occupant is seated in the opposite seat that is on the side opposite to the driving seat S1 in the parking assist period although the occupant is seated in the opposite seat that is on the side opposite to the driving seat S1 in the learning period. In this case, the target setting part 1321 determines that the predetermined difference condition is satisfied. Namely, in the present embodiment, the predetermined difference condition includes, as one example of the predetermined difference condition, a first difference condition that there is such a difference that no occupant is seated in the opposite seat that is on the side opposite to the driving seat S1 in the parking assist period although the occupant is seated in the opposite seat that is on the side opposite to the driving seat S1 in the learning period between the position of the occupant during the learning period and the position of the occupant during the parking assist period.

If the first difference condition is satisfied, it is estimated that the occupant has to get out of the vehicle 1 to an alighting space (in other words, an exit space or a dropping off space) on the left of the vehicle 1 after the driver finishes parking the vehicle 1 in the learning period, because the occupant is seated in the opposite seat that is on the side opposite to the driving seat S1 in the learning period. Thus, the driver is supposed to park the vehicle 1 in the learning period to secure (in other words, allow) the alighting space that is enough for the occupant to get out of the vehicle 1 on the left of the vehicle 1. Therefore, if the target parking position Ptgt is not adjusted, the parking assist unit 132 is also supposed to automatically park the vehicle 1 to secure the alighting space that is enough for the occupant to get out of the vehicle 1 on the left of the vehicle 1. However, if the first difference condition is satisfied, it is estimated that no occupant gets out of the vehicle 1 to the alighting space on the left of the vehicle 1 after the parking assist operation finishes parking the vehicle 1, because no occupant is seated in the opposite seat that is on the side opposite to the driving seat S1 in the parking assist period. Therefore, the alighting space secured on the left of the vehicle 1 may be an unnecessary space that is not useful for the occupant and/or the driver to get out of the vehicle 1. Namely, if the target parking position Ptgt is not adjusted, the unnecessary space may be secured on the left of the vehicle 1. On the other hand, it is estimated that the driver is supposed to get out of the vehicle 1 to an alighting space on the right of the vehicle 1 after the parking assist operation finishes parking the vehicle 1, because the driver is seated in the driving seat S1 in the parking assist period. Thus, broadening the alighting space on the right of the vehicle 1 to allow the driver to get out of the vehicle 1 more easily is more preferable than securing the unnecessary space on the left of the vehicle 1.

Thus, if the first difference condition is satisfied, the target setting part 1321 adjusts the target parking position Ptgt so that the alighting space on the right of the vehicle 1 (namely, on the driving seat S1 side) is broaden to allow the driver to get out of the vehicle 1 more easily (a step S244). Specifically, the target setting part 1321 adjusts the target parking position Ptgt so that the target parking position Ptgt is shifted toward the left side (namely, the left side in the direction of the width of the vehicle 1) by a first predetermined amount (the step S244). Namely, the target setting part 1321 adjusts the target parking position Ptgt so that the target parking position Ptgt is shifted toward a direction from the driving seat S1 to the opposite seat on the side opposite to the driving seat S1 by the first predetermined amount. Note that the first predetermined amount is set to an appropriate value by which the alighting space that allows the driver to get out of the vehicle 1 easily is secured on the right of the vehicle 1.

However, even if the first difference condition is satisfied, there is not necessarily an enough space, in which the vehicle 1 is allowed to exist, on the left of the non-adjusted target parking position Ptgt. For example, there is a possibility that there is the obstacle SC, which prevents the vehicle 1 from entering the space on the left of the non-adjusted target parking position Ptgt, on the left of the non-adjusted target parking position Ptgt. If the target parking position Ptgt is adjusted even when there is no enough space, there is a possibility that the vehicle 1 is not allowed to be appropriately parked in the adjusted target parking position Ptgt. Thus, in the present embodiment, the target setting part 1321 determines whether or not there is enough space on the left of the non-adjusted target parking position Ptgt on the basis of the parking information (especially, the information relating to the obstacle SC) learned by the learning unit 131 before actually adjusting the target parking position Ptgt (a step S243). As a result of the determination at the step S243, if it is determined that there is enough space (the step S243: Yes), the target setting part 1321 adjusts the target parking position Ptgt (a step S244). On the other hand, as a result of the determination at the step S243, if it is determined that there is not enough space (the step S243: No), the target setting part 1321 does not adjust the target parking position Ptgt.

On the other hand, as a result of the determination at the step S241, if it is determined that no occupant is seated in the opposite seat that is on the side opposite to the driving seat S1 (namely, no occupant is seated in the front passenger seat S2 and the rear-left seat S3) in the learning period (the step S241: No), the target setting part 1321 determines whether or not the occupant is seated in the opposite seat that is on the side opposite to the driving seat S1 in the parking assist period (namely, now) on the basis of the detection result of the occupant detect apparatus 12 (a step S245).

As a result of the determination at the step S245, if it is determined that no occupant is seated in the opposite seat that is on the side opposite to the driving seat S1 (namely, no occupant is seated in the front passenger seat S2 and the rear-left seat S3) in the parking assist period (the step S245: No), no occupant is seated in the opposite seat that is on the side opposite to the driving seat S1 in both of the learning period and the parking assist period. In this case, the target setting part 1321 does not determine that the predetermined difference condition is satisfied. In other words, the target setting part 1321 determines that the predetermined difference condition is not satisfied. Thus, the target setting part 1321 does not adjust the target parking position Ptgt learned by the learning unit 131 in the learning operation On the other hand, as a result of the determination at the step S245, if it is determined that the occupant is seated in the opposite seat that is on the side opposite to the driving seat S1 in the parking assist period (the step S245: Yes), the occupant is seated in the opposite seat that is on the side opposite to the driving seat S1 in the parking assist period although no occupant is seated in the opposite seat that is on the side opposite to the driving seat S1 in the learning period. In this case, the target setting part 1321 determines that the predetermined difference condition is satisfied. Namely, in the present embodiment, the predetermined difference condition includes, as another one example of the predetermined difference condition, a second difference condition that there is such a difference that the occupant is seated in the opposite seat that is on the side opposite to the driving seat S1 in the parking assist period although no occupant is seated in the opposite seat that is on the side opposite to the driving seat S1 in the learning period between the position of the occupant during the learning period and the position of the occupant during the parking assist period.

If the second difference condition is satisfied, it is estimated that no occupant has to get out of the vehicle 1 to the alighting space on the left of the vehicle 1 after the driver finishes parking the vehicle 1 in the learning period, because no occupant is seated in the opposite seat that is on the side opposite to the driving seat S1 in the learning period. Thus, there is a possibility that the driver parks the vehicle 1 in the learning period without securing the alighting space that is enough for the occupant to get out of the vehicle 1 on the left of the vehicle 1. Therefore, if the target parking position Ptgt is not adjusted, the parking assist unit 132 is also supposed to automatically park the vehicle 1 without securing the alighting space that is enough for the occupant to get out of the vehicle 1 on the left of the vehicle 1. However, if the second difference condition is satisfied, it is estimated that the occupant has to get out of the vehicle 1 to the alighting space on the left of the vehicle 1 after the parking assist operation finishes parking the vehicle 1, because the occupant is seated in the opposite seat that is on the side opposite to the driving seat S1 in the parking assist period. Therefore, if there is not enough alighting space on the left of the vehicle 1, there is a possibility that it is difficult for the occupant (especially, the occupant seated in the opposite seat on the side opposite to the driving seat S1) to get out of the vehicle 1.

Thus, if the second difference condition is satisfied, the target setting part 1321 adjusts the target parking position Ptgt so that the alighting space on the left of the vehicle 1 (namely, on the side opposite to the driving seat S1) is broaden to allow the occupant (especially, the occupant seated in the opposite seat on the side opposite to the driving seat S1) to get out of the vehicle 1 more easily (a step S247). Specifically, the target setting part 1321 adjusts the target parking position Ptgt so that the target parking position Ptgt is shifted toward the right side (namely, the right side in the direction of the width of the vehicle 1) by a second predetermined amount (the step S247). Namely, the target setting part 1321 adjusts the target parking position Ptgt so that the target parking position Ptgt is shifted toward a direction from the opposite seat on the side opposite to the driving seat S1 to the driving seat S1 by the second predetermined amount.

Note that the second predetermined amount is set to an appropriate value by which the alighting space that allows the occupant to get out of the vehicle 1 easily is secured on the left of the vehicle 1. However, if the second predetermined amount becomes too large, there is a possibility that the alighting space on the right of the vehicle 1 becomes too small. As a result, there is a possibility that it is difficult for the driver to get out of the vehicle 1. Thus, it is preferable that the second predetermined amount be set to an appropriate value by which not only the alighting space that allows the occupant to get out of the vehicle 1 easily is secured on the left of the vehicle 1 but also the alighting space that allows the driver to get out of the vehicle 1 easily is secured on the right of the vehicle 1.

However, even if the second difference condition is satisfied, there is not necessarily an enough space, in which the vehicle 1 is allowed to exist, on the right of the non-adjusted target parking position Ptgt. For example, there is a possibility that there is the obstacle SC, which prevents the vehicle 1 from entering the space on the right of the non-adjusted target parking position Ptgt, on the right of the non-adjusted target parking position Ptgt. If the target parking position Ptgt is adjusted even when there is no enough space, there is a possibility that the vehicle 1 is not allowed to be appropriately parked in the adjusted target parking position Ptgt. Thus, in the present embodiment, the target setting part 1321 determines whether or not there is enough space on the right of the non-adjusted target parking position Ptgt on the basis of the parking information (especially, the information relating to the obstacle SC) learned by the learning unit 131 before actually adjusting the target parking position Ptgt (a step S246). As a result of the determination at the step S246, if it is determined that there is enough space (the step S246: Yes), the target setting part 1321 adjusts the target parking position Ptgt (a step S247). On the other hand, as a result of the determination at the step S246, if it is determined that there is not enough space (the step S246: No), the target setting part 1321 does not adjust the target parking position Ptgt.

Then, the route calculating part 1322 generates a traveling route along which the vehicle 1 should travel from the current position of the vehicle 1 to the target parking position Ptgt (a step S25). Specifically, if the target parking position Ptgt is adjusted at the above described step S244 or S247, the route calculating part 1322 generates a traveling route along which the vehicle 1 should travel from the current position of the vehicle 1 to the adjusted target parking position Ptgt. On the other hand, if the target parking position Ptgt is not adjusted at the above described steps S244 and S247, the route calculating part 1322 generates a traveling route along which the vehicle 1 should travel from the current position of the vehicle 1 to the target parking position Ptgt learned by the learning unit 131.

The route calculating part 1322 may generate the traveling route on the basis of the detection result of the external surrounding detect apparatus 11. The route calculating part 1322 may generate the traveling route on the basis of the parking information learned by the learning unit 131 in addition to or instead of the detection result of the external surrounding detect apparatus 11. Note that an existing method of generating the traveling route may be used as the method of generating the traveling route and thus the detailed description of the method of generating the traveling route will be omitted.

Then, the vehicle controlling part 1323 makes the vehicle 1 automatically travel along the traveling route generated at the step S25 by controlling a power source (for example, an engine) of the vehicle 1, a brake apparatus of the vehicle 1 and a steering apparatus of the vehicle 1 (a step S26). As a result, the vehicle 1 is automatically parked in the in the target parking position Ptgt in the parking space SP without requiring the user's operation of an acceleration pedal, a brake pedal and a steering wheel.

(3) Technical Effect

As described above, in the present embodiment, the parking assist unit 132 is capable of adjusting the target parking position Ptgt learned by the learning unit 131 on the basis of the difference between the position of the occupant during the learning period and the position of the occupant during the parking assist period so that it is easier to get out of the vehicle 1 after the parking assist operation finishes parking the vehicle 1. Thus, the parking assist unit 132 is capable of automatically parking the vehicle 1 in the more appropriate target parking position Ptgt (namely, the target parking position Ptgt that allows the occupant and/or the driver to get out of the vehicle 1 more easily). In the following description, this technical effect of the present embodiment will be described with reference to FIG. 6(a) to FIG. 6(c) and FIG. 7(a) to FIG. 7(c).

Figure 6B:
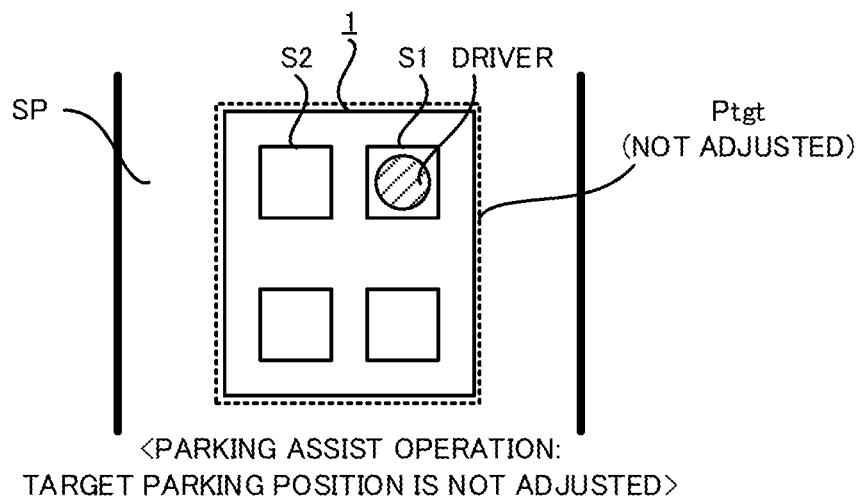
FIG. 6(b) is a planar view that illustrates a target parking position that is not yet adjusted by the parking assist operation and FIG. 6(c) is a planar view that illustrates a target parking position that is already adjusted by the parking assist operation due to a satisfaction of a first difference condition.
Figure 6C:
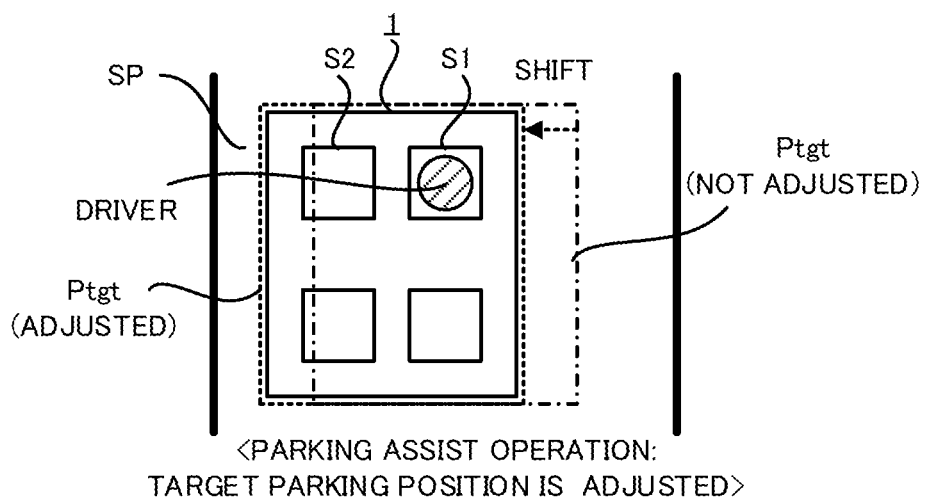

FIG. 6(a) illustrate the target parking position Ptgt in the parking space SP that is learned by the leaning operation under the situation where the occupant is seated in the front passenger seat S2 (namely, the opposite seat on the side opposite to the driving seat S1). After the learning operation for learning the target parking position Ptgt under the situation illustrated in FIG. 6(a), the parking assist operation starts under the situation where no occupant is seated in the front passenger seat S2 and the rear-left seat S3 (namely, the opposite seat on the side opposite to the driving seat S1) as illustrated in FIG. 6(b). In this case, the first difference condition that no occupant is seated in the opposite seat that is on the side opposite to the driving seat S1 in the parking assist period although the occupant is seated in the opposite seat that is on the side opposite to the driving seat S1 in the learning period is satisfied. Thus, as illustrated in FIG. 6(c), the target parking position Ptgt is adjusted so that the target parking position Ptgt is shifted to the left side. As a result, the alighting space on the right of the vehicle 1 becomes larger (in other words, broader), compared to the case where the target parking position Ptgt is not adjusted (namely, the first difference condition is not satisfied). Thus, it is easier for the driver to get out of the vehicle 1 after the parking assist operation finishes parking the vehicle 1.

Figure 7A:
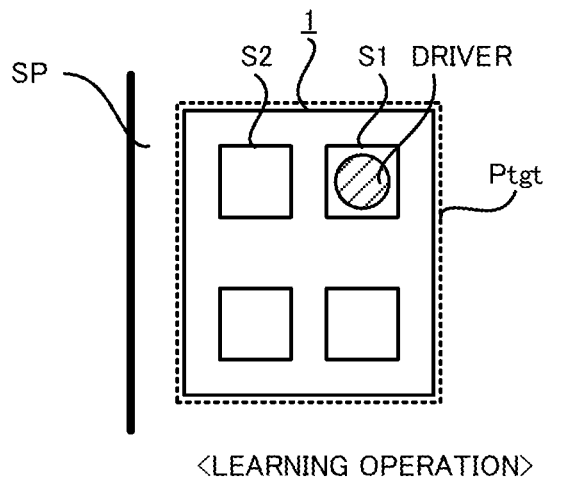
FIG. 7(a) is a planar view that illustrates a target parking position learned by the learning operation.
Figure 7B:
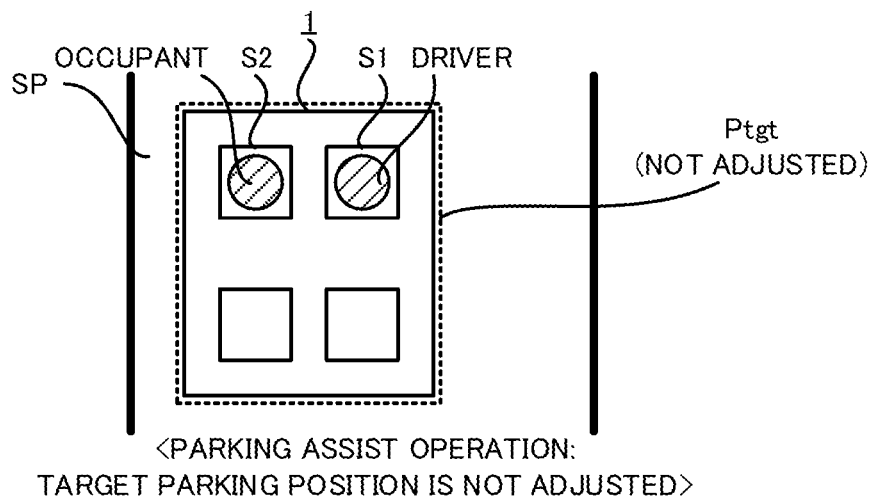
FIG. 7(b) is a planar view that illustrates a target parking position that is not yet adjusted by the parking assist operation and FIG. 7(c) is a planar view that illustrates a target parking position that is already adjusted by the parking assist operation due to a satisfaction of a second difference condition.
Figure 7C:
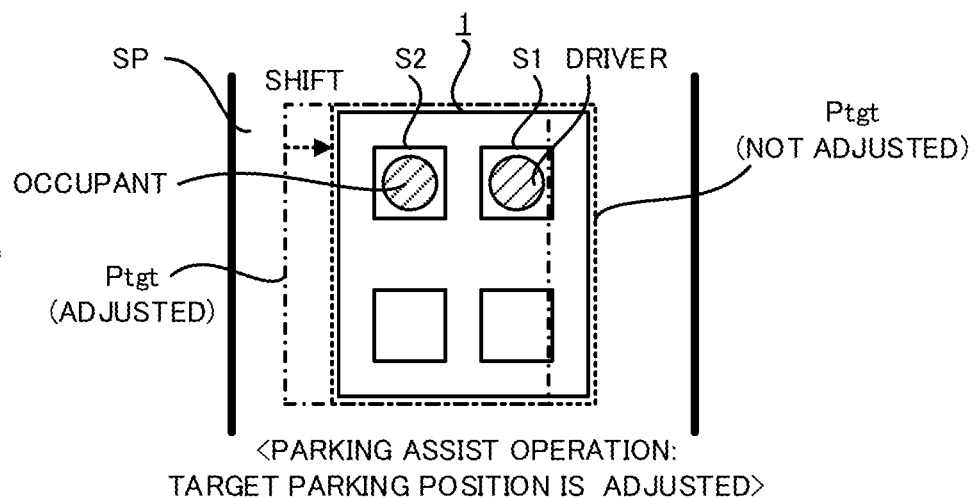

On the other hand, FIG. 7(a) illustrate the target parking position Ptgt in the parking space SP that is learned by the leaning operation under the situation where no occupant is seated in the front passenger seat S2 and the rear-left seat S3 (namely, the opposite seat on the side opposite to the driving seat S1). After the learning operation for learning the target parking position Ptgt under the situation illustrated in FIG. 7(a), the parking assist operation starts under the situation where the occupant is seated in the front passenger seat S2 (namely, the opposite seat on the side opposite to the driving seat S1) as illustrated in FIG. 7(b). In this case, the second difference condition that the occupant is seated in the opposite seat that is on the side opposite to the driving seat S1 in the parking assist period although no occupant is seated in the opposite seat that is on the side opposite to the driving seat S1 in the learning period is satisfied. Thus, as illustrated in FIG. 7(c), the target parking position Ptgt is adjusted so that the target parking position Ptgt is shifted to the right side. As a result, the alighting space on the left of the vehicle 1 becomes larger (in other words, broader), compared to the case where the target parking position Ptgt is not adjusted (namely, the second difference condition is not satisfied). Thus, it is easier for the occupant (especially, the occupant seated in the opposite seat on the side opposite to the driving seat S1) to get out of the vehicle 1 after the parking assist operation finishes parking the vehicle 1.

(4) Modified Example

The above described description uses the vehicle 1 in which the driving seat S1 is located on the front side and the right side in the cabin. However, the above described learning operation and the parking assist operation may be performed in a vehicle in which the driving seat is located on the front side and the left side in the cabin. However, in this case, the opposite seat on the side opposite to the driving seat corresponds to the front passenger seat and the rear-right seat. Moreover, if it is determined that the first difference condition is satisfied, the target setting part 1321 determines whether or not there is enough space on the right (namely, on the side opposite to the driving seat S1) of the vehicle 1. If it is determined that there is enough space on the right of the vehicle 1, the target parking position Ptgt is adjusted so that the target parking position Ptgt is shifted to the right side by the first predetermined amount. On the other hand, if it is determined that the second difference condition is satisfied, the target setting part 1321 determines whether or not there is enough space on the left (namely, on the driving seat S1 side) of the vehicle 1. If it is determined that there is enough space on the left of the vehicle 1, the target parking position Ptgt is adjusted so that the target parking position Ptgt is shifted to the left side by the second predetermined amount.

In the above described description, the target setting part 1321 determines whether or not there is enough space on the left of the non-adjusted target parking position Ptgt, if the first difference condition is satisfied, and then the target setting part 1321 adjusts the target parking position Ptgt, if it is determined that there is enough space. However, the target setting part 1321 may adjust the target parking position Ptgt without determining whether or not there is enough space on the left of the non-adjusted target parking position Ptgt, if the first difference condition is satisfied. In the same manner, in the above described description, the target setting part 1321 determines whether or not there is enough space on the right of the non-adjusted target parking position Ptgt, if the second difference condition is satisfied, and then the target setting part 1321 adjusts the target parking position Ptgt, if it is determined that there is enough space. However, the target setting part 1321 may adjust the target parking position Ptgt without determining whether or not there is enough space on the right of the non-adjusted target parking position Ptgt, if the second difference condition is satisfied.

(5) Additional Statement

Relating to the above described embodiment, following additional statements will be disclosed.

(5-1) Additional Statement 1

A parking assist apparatus according to the additional statement 1 is a parking assist apparatus having: a learning device that is configured to perform a learning operation for learning, as a target parking position, a position in a predetermined parking space in which a vehicle is parked when the vehicle is parked in the parking space by a driver's operation; and an assisting device that is configured to perform a parking assist operation for automatically parking the vehicle in the target parking position on the basis of a learning result of the learning device, wherein if a predetermined condition that there is a predetermined difference between a position of an occupant in the vehicle during an assist period when the assisting device performs the parking assist operation and a position of an occupant in the vehicle during a learning period when the learning device performs the learning operation is satisfied, the assisting device is configured to adjust the target parking position on the basis of the difference so that it is easier to get out of the vehicle after the parking assist operation is finished, compared to a case where the predetermined condition is not satisfied, and then to perform the parking assist operation for automatically parking the vehicle in the adjusted target parking position.

A parking assist apparatus according to the additional statement 1 may be a parking assist apparatus having a controller, the controller being programmed to perform a learning operation for learning, as a target parking position, a position in a predetermined parking space in which a vehicle is parked when the vehicle is parked in the parking space by a driver's operation; and perform a parking assist operation for automatically parking the vehicle in the target parking position on the basis of a learning result, wherein if a predetermined condition that there is a predetermined difference between a position of an occupant in the vehicle during an assist period when the parking assist operation is performed and a position of an occupant in the vehicle during a learning period when the learning operation is performed is satisfied, the controller is programmed to adjust the target parking position on the basis of the difference so that it is easier to get out of the vehicle after the parking assist operation is finished, compared to a case where the predetermined condition is not satisfied, and then to perform the parking assist operation for automatically parking the vehicle in the adjusted target parking position.

The parking assist apparatus according to the additional statement 1 is capable of adjusting the target parking position on the basis of the difference between the position of the occupant in the vehicle during the assisting period and the position of the occupant in the vehicle during the learning period so that it is easier to get out of the vehicle after the parking assist operation is finished. Thus, the parking assist apparatus according to the additional statement 1 is capable of automatically parking the vehicle in the more appropriate parking position (namely, the parking position that allows the occupant and/or a driver to get out of the vehicle more easily) on the basis of the position of the occupant in the vehicle.

(5-2) Additional Statement 2

A parking assist apparatus according to the additional statement 2 is the parking assist apparatus according to the additional statement 1, wherein the predetermined condition includes a first condition that no occupant is seated in a second seat during the assist period although an occupant is seated in the second seat during the learning period, the second seat is located on the right or the left of a first seat in which a driver is seated, if the first condition is satisfied, the assisting device is configured to adjust the target parking position so that a space to which the driver gets out of the vehicle becomes larger compared to a case where the first condition is not satisfied.

A parking assist apparatus according to the additional statement 2 may be the parking assist apparatus according to the additional statement 1, wherein the predetermined condition includes a first condition that no occupant is seated in a second seat during the assist period although an occupant is seated in the second seat during the learning period, the second seat is located on the right or the left of a first seat in which a driver is seated, if the first condition is satisfied, the controller is programmed to adjust the target parking position so that a space to which the driver gets out of the vehicle becomes larger compared to a case where the first condition is not satisfied.

The parking assist apparatus according to the additional statement 2 is capable of automatically parking the vehicle in the more appropriate parking position (namely, the parking position that allows the driver seated in the first seat to get out of the vehicle more easily), when there is such a difference that no occupant is seated in the second seat during the assist period although the occupant is seated in the second seat during the learning period between the position of the occupant in the vehicle during the assist period and the position of the occupant in the vehicle during the learning period.

(5-3) Additional Statement 3

A parking assist apparatus according to the additional statement 3 is the parking assist apparatus according to the additional statement 2, wherein the assisting device is configured to adjust the target parking position so that the adjusted target parking position is away from the non-adjusted target parking position toward a first direction that is a direction from the first seat to the second seat.

A parking assist apparatus according to the additional statement 3 may be the parking assist apparatus according to the additional statement 2, wherein the controller is programmed to adjust the target parking position so that the adjusted target parking position is away from the non-adjusted target parking position toward a first direction that is a direction from the first seat to the second seat.

The parking assist apparatus according to the additional statement 3 is capable of automatically parking the vehicle in the more appropriate parking position (namely, the parking position that allows the driver seated in the first seat to get out of the vehicle more easily), when there is such a difference that no occupant is seated in the second seat during the assist period although the occupant is seated in the second seat during the learning period between the position of the occupant in the vehicle during the assist period and the position of the occupant in the vehicle during the learning period.

(5-4) Additional Statement 4

A parking assist apparatus according to the additional statement 4 is the parking assist apparatus according to any one of the additional statements 1 to 3, wherein the predetermined condition includes a second condition that an occupant is newly seated in a second seat during the assist period although no occupant is seated in the second seat during the learning period, the second seat is located on the right or the left of a first seat in which a driver is seated, if the second condition is satisfied, the assisting device is configured to adjust the target parking position so that a space to which the occupant seated in the second seat gets out of the vehicle becomes larger compared to a case where the second condition is not satisfied.

A parking assist apparatus according to the additional statement 4 may be the parking assist apparatus according to any one of the additional statements 1 to 3, wherein the predetermined condition includes a second condition that an occupant is newly seated in a second seat during the assist period although no occupant is seated in the second seat during the learning period, the second seat is located on the right or the left of a first seat in which a driver is seated, if the second condition is satisfied, the controller is programmed to adjust the target parking position so that a space to which the occupant seated in the second seat gets out of the vehicle becomes larger compared to a case where the second condition is not satisfied.

The parking assist apparatus according to the additional statement 4 is capable of automatically parking the vehicle in the more appropriate parking position (namely, the parking position that allows the occupant seated in the second seat to get out of the vehicle more easily), when there is such a difference that the occupant is newly seated in the second seat during the assist period although no occupant is seated in the second seat during the learning period between the position of the occupant in the vehicle during the assist period and the position of the occupant in the vehicle during the learning period.

(5-5) Additional Statement 5

A parking assist apparatus according to the additional statement 5 is the parking assist apparatus according to the additional statement 4, wherein the assisting device is configured to adjust the target parking position so that the adjusted target parking position is away from the non-adjusted target parking position toward a second direction that is a direction from the second seat to the first seat.

A parking assist apparatus according to the additional statement 5 may be the parking assist apparatus according to the additional statement 4, wherein the controller is programmed to adjust the target parking position so that the adjusted target parking position is away from the non-adjusted target parking position toward a second direction that is a direction from the second seat to the first seat.

The parking assist apparatus according to the additional statement 5 is capable of automatically parking the vehicle in the more appropriate parking position (namely, the parking position that allows the occupant seated in the second seat to get out of the vehicle more easily), when there is such a difference that the occupant is newly seated in the second seat during the assist period although no occupant is seated in the second seat during the learning period between the position of the occupant in the vehicle during the assist period and the position of the occupant in the vehicle during the learning period.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-147946, filed on Jul. 31, 2017, the entire contents of which are incorporated herein by reference. In addition, the entire contents of the above described Patent Literatures 1 and 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A parking assist apparatus, which involve such changes, are also intended to be within the technical scope of the present invention.

REFERENCE SIGNS LIST 1 vehicle
11 external surrounding detect apparatus
12 occupant detect apparatus
13 ECU
131 learning unit
132 parking assist unit
1321 target setting part
1322 route calculating part
1323 vehicle controlling part
SP parking space
WL white line
TR traveling route
SC obstacle
S1 driving seat
S2 front passenger seat
S3 rear-left seat
S4 rear-right seat
Pstart start position
Pend parking finish position
Ptgt target parking position

The invention claimed is:

1. A parking assist apparatus comprising a controller, the controller programmed to:
perform a learning operation for learning, as a target parking position, a position in a predetermined parking space in which a vehicle is parked when the vehicle is parked in the parking space by a driver's operation; and
perform a parking assist operation for automatically parking the vehicle in the target parking position on the basis of a learning result,
wherein
when the parking assist operation is performed, determine whether or not a predetermined condition is satisfied, wherein the predetermined condition is that there is a predetermined difference between a position of an occupant in the vehicle during an assist period when the parking assist operation is performed and a position of an occupant in the vehicle during a learning period when the learning operation is performed,
when the predetermined condition is satisfied, the controller is programmed to adjust the target parking position on the basis of the difference so that it is easier to get out of the vehicle after the parking assist operation is finished, compared to a non-adjusted target parking position, and then to perform the parking assist operation for automatically parking the vehicle in the adjusted target parking position, and
when the predetermined condition is not satisfied, the controller is programmed to perform the parking assist operation for automatically parking the vehicle in the non-adjusted target parking position.

2. The parking assist apparatus according to claim 1, wherein
the predetermined condition includes a first condition that no occupant is seated in a second seat during the assist period although an occupant is seated in the second seat during the learning period, the second seat is located on the right or the left of a first seat in which a driver is seated,
when the first condition is satisfied, the controller is programmed to adjust the target parking position so that a space to which the driver gets out of the vehicle becomes larger compared to a case where the first condition is not satisfied.

3. The parking assist apparatus according to claim 2, wherein
the controller is programmed to adjust the target parking position so that the adjusted target parking position is away from the non-adjusted target parking position toward a first direction that is a direction from the first seat to the second seat.

4. The parking assist apparatus according to claim 1, wherein
the predetermined condition includes a second condition that an occupant is newly seated in a second seat during the assist period although no occupant is seated in the second seat during the learning period, the second seat is located on the right or the left of a first seat in which a driver is seated,
when the second condition is satisfied, the controller is programmed to adjust the target parking position so that a space to which the occupant seated in the second seat gets out of the vehicle becomes larger compared to a case where the second condition is not satisfied.

5. The parking assist apparatus according to claim 4, wherein
the controller is programmed to adjust the target parking position so that the adjusted target parking position is away from the non-adjusted target parking position toward a second direction that is a direction from the second seat to the first seat.

* * * * *